United States Patent [19]

Nagata et al.

[11] 3,731,076
[45] May 1, 1973

[54] SYSTEM FOR PREVENTING IMPROPER USE OF CREDIT CARDS

[75] Inventors: Masanori Nagata; Keisuke Osaki, both of Kyoto, Japan

[73] Assignee: Omron Tateisi Electronics Co., Kyoto, Japan

[22] Filed: Feb. 25, 1971

[21] Appl. No.: 118,600

[30] Foreign Application Priority Data

Mar. 3, 1970    Japan.................................45/18496

[52] U.S. Cl.............235/61.7 B, 317/134, 340/149 A
[51] Int. Cl..............................G06f 7/04, H04q 3/02
[58] Field of Search................235/61.7 B, 61.7 R;
    340/149 A, 149 R; 179/90; 200/61.66;
    70/278; 317/134, 134 R; 180/99

[56] References Cited

UNITED STATES PATENTS 3,588,449    6/1971    Paterson.........................235/61.7 B
3,587,051    6/1971    Hovey..............................317/134 R

FOREIGN PATENTS OR APPLICATIONS 1,197,183    7/1970    Great Britain...................235/61.7 B

*Primary Examiner*—Thomas A. Robinson
*Attorney*—Christensen & Sanborn

[57] ABSTRACT

A system for preventing improper use of credit cards having necessary data recorded thereon in card-actuated machines, wherein the system checks for a predetermined correspondence between the data read from a card inserted into the machine, and the data manually entered by the user of the card. If a correspondence does not exist, the stored number of times of absence of said correspondence with respect to the individual card is increased. When the stored number reaches a predetermined number, the card is invalidated.

14 Claims, 4 Drawing Figures

Patented May 1, 1973

INVENTORS
MASANORI NAGATA
KEISUKE OSAKI
BY
Christensen & Sanborn
ATTORNEYS

SYSTEM FOR PREVENTING IMPROPER USE OF CREDIT CARDS

This invention relates to a system for preventing improper use of cards such as credit cards and bank cards.

In recent years, credit cards have come to be widely used in various transactions with shops, banks and like establishments. As is well known, each card has recorded thereon its identification number or the account number of the owner of the card. When a card is used in, say, an automatic cash dispensing machine, the account number recorded on the card is checked with respect to its validity, and only when the account number has been recognized as valid, the desired transaction is performed. In this case, however, only the validity or invalidity of the account number of the card is checked. Under this condition, even if the card is used by an improper owner, the required transaction is made so long as the card is recognized as valid. To prevent this, it has been proposed to give the proper owner of each card a secret number having a predetermined relation to the account number, so that when the user of a card puts it into the machine, he also enters the secret number he memorizes into the machine. The machine compares the account number read from the card and the secret number entered by the keyboard, and if the proper relation or correspondence is present between the two numbers, the user of the card is recognized as its proper owner, whereupon the required transaction is conducted, that is, the machine dispenses an article or cash, or accepts a deposit.

On the contrary, if no such proper correspondence exists between the two numbers, the card may be returned to its user, or collected into the machine so as not to be returned again. In the former case, it will benefit the improper as well as the proper owner of a card. The proper owner who must know the correct secret number of the card can introduce the returned card and the correct secret number into the machine again. The improper owner who cannot know the correct secret number can operate the machine again and again with the returned card, entering various numbers into the machine by guesswork until he might finally get the correct secret number. This cannot occur in the latter case where the card is not returned to the user when the proper correspondence does not exist between the account number and the secret number. However, this is very inconvenient to the proper owner of a card, because once the card is collected into the machine he cannot use it again, even when he remembers the correct secret number later. To solve this problem, the arrangement may be such that when the above-mentioned correspondence does not exist, the card is returned to the user, upon pressing of a return push button, before entering of the secret number has been repeated a predetermined number, say, three times. In this case, if the proper correspondence cannot be attained after the secret number has been entered twice, the proper user of the card may consider the secret number having been incorrectly memorized, so that after getting the correct secret number he can properly use the card in the machine with the correct secret number. However, this arrangement will benefit the improper owner of a card, too. By repeatedly pressing the return pushbutton to have the card returned after entering different secret numbers into the machine two times in succession, the improper owner may finally get the proper correspondence without his card being collected into the machine.

Accordingly, the primary object of the invention is to provide a system for preventing improper use of cards such as credit cards, bank cards or the like.

Another object of the invention is to provide a system for preventing improper use of cards by unauthorized persons while giving the proper owner of a card a chance to correct errors in entering the secret number into the machine.

Another object of the invention is to provide a system for preventing improper use of cards, wherein the number of times the secret number of a card has been erroneously entered into the machine is recorded in a recording medium, so that when the card has been repeatedly used until the above-mentioned number reaches a predetermined number, the card is invalidated so as not to be used again.

The invention will be clearly understood from the following description of some preferred embodiments thereof with reference to the accompanying drawings, wherein like reference numerals in different figures denote corresponding parts, and wherein:

FIG. 2 is a schematic front view of a card-actuated machine the invention is applied to;

Figure 1:
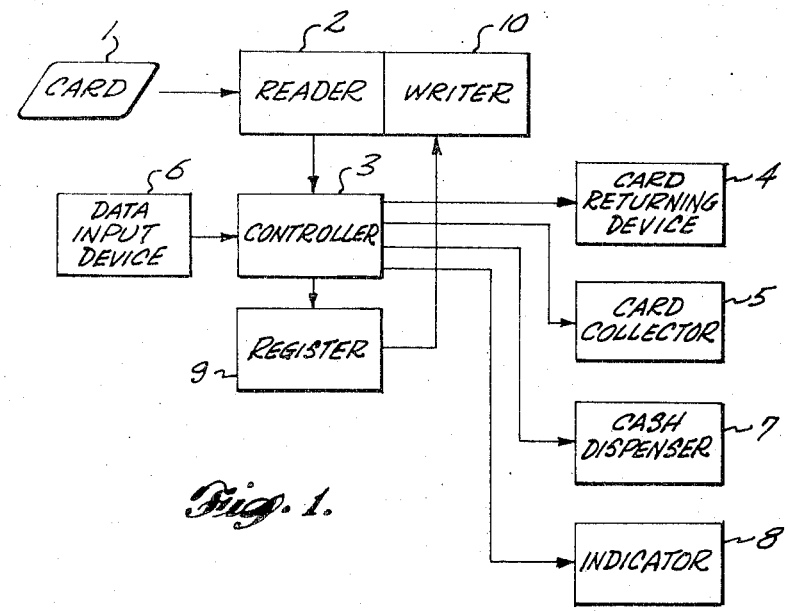
FIG. 1 is an electrical block diagram of one embodiment of the invention.
Figure 2:
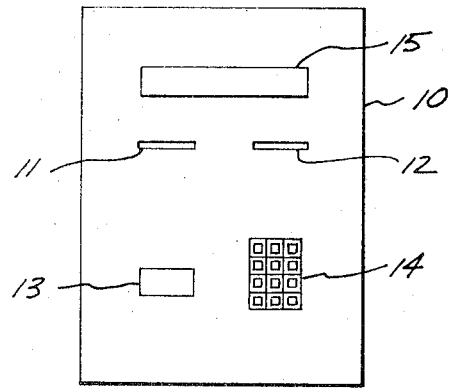
Figure 3:
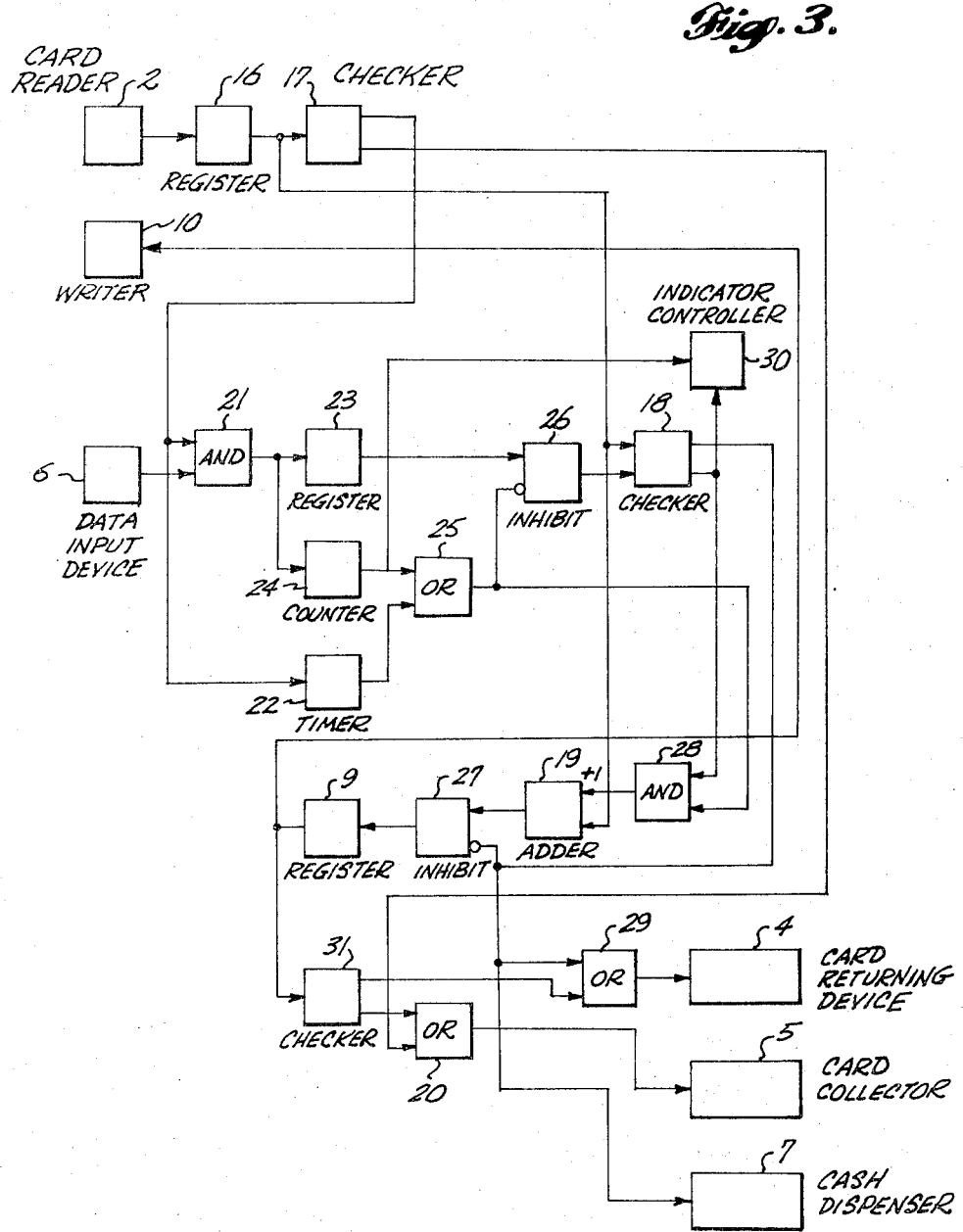
FIG. 3 is a detailed diagram of the system of FIG. 1.

FIGS. 1–3 show one embodiment of this invention as applied to a cash dispensing machine. In FIG. 1, there is schematically shown a card 1 of a well known type, on which various data are magnetically recorded. The data may include the identification number of the card or the account number of the owner of the card, the number of times the card has until then been used, and other necessary information. When the card 1 is introduced into the machine, a reader 2 reads the data on the card. The data read by the reader 2 are sent to a controller 3, which checks the data, that is, whether the card number is valid, whether there is a balance left in the account, and whether the number of times the card has been used has exceeded a predetermined limit. If the data is found improper, a card returning device 4 is operated to return the card to the user, or a card collector 5 collects the card into a suitable receptacle, not shown. If the card data is found proper, the controller 3 accepts the data manually introduced or entered by a data input device 6. The data will hereinafter be referred to as the manual data.

The device 6 includes a keyboard or a dial, and the manual data includes the secret number of the card, the amount of money requested to be withdrawn, etc. The controller 3 checks the manual data to see whether the amount requested exceeds the balance left and whether there is a predetermined proper correspondence between the secret number and the account number.

If the arrangement is such that the balance left is recorded on the card, the above checking is conducted by comparing the data concerning the balance left as included in the card data with the data concerning the amount of money requested to be withdrawn, as included in the manual data. If it is possible to pay the amount of money requested, a dispenser 7 is operated on the basis of the result of checking of the secret number. If the amount of money requested exceeds the balance left, the device 4 operates to return the card to its owner and at the same time an indicator 8 gives a corresponding indication.

The simplest method of checking the secret number is to see if there is a predetermined correspondence between the card number included in the card data and the secret number included in the manual data. This method requires that the controller 3 includes only a coincidence circuit. If the controller 3 has a memory device like a computer, it is addressed by the card data to derive a corresponding secret nmber so as to check whether the required correspondence exists between this derived secret number and the secret number included in the manual data. The memory device may also be addressed by the secret number in the manual data to locate a corresponding card number so as to see if there is the proper correspondence between the located card number and the card number read from the card used.

When the proper correspondence exists, the dispenser 7 operates to dispense the amount of money requested to be withdrawn. If no such proper correspondence exists between the two numbers, the indicator 8 gives instructions that the user of the machine should enter the secret number again. If no proper correspondence has been attained between the two numbers after such entering of a secret number has been repeated three times, the device 4 operates to return the card to its owner. At the same time a register 9 stores the number of times the secret number has been erroneously entered or the number of times the card has been returned to the user. These numbers will hereinafter be referred to as the error number. The error number stored in the register 9 is transferred to a writer 10, which magnetically writes the error number on the card when it is returned to the owner. In the above example, the arrangement is such that when the secret number has been erroneously entered three times, the card is returned. This error number, however, may be greater or smaller.

If an error occurs with respect to a card on which an error number has already been recorded, the new error is added in the controller 3 to the previous error number recorded on the card and the increased error number is sent to the register 9 and then written on the card in place of the previous error number. If the new, increased error number stored in the register 9 reaches a predetermined limit number, the controller 3 operates the collector 5 to collect the card into the machine.

If the error number is the number of times the secret number has been erroneously entered, the error number becomes three when the secret number has been erroneously entered three times, so that the card is returned to the user. Therefore, if the limit of the error number is set to 12, the card is collected when it is to be returned for the fourth time.

If the error number is the number of times the card has been returned, the error number becomes one when the card is returned when the secret number has been erroneously entered three times. In this case, if the limit of the error number is set to four, the card is collected when it has been fraudulently used four times.

In the above example, the error number included in the card data is checked after the controller receives the manual data. The arrangement may also be such that the error number is checked upon reading of the card data by the reader 2. With this arrangement, to take the above latter example, even when the card has been fraudulently used four times, the card is returned with a notice or something to the effect that the card can no longer be used, and if this card should be used for the fifth time, it is immediately collected into the machine.

The arrangement may also be such that the card returning device 4 operates when no manual data is introduced through the device 6 for a predetermined period of time after the card was introduced. In this case, the error number in the card data is increased by one.

FIG. 2 shows a cash dispenser having a front panel 10. Two slots 11 and 12 are formed in the panel 10. The card is introduced or returned through the slot 11. The card may be delivered out together with cash or a receipt through an outlet 13 formed below the slot 11. A mortgage such as a check is introduced through the slot 12. The data input device 6 has a keyboard 14 provided below the slot 12, and the indicator 8 has a window 15 above the slots 11 and 12.

Turning to FIG. 3, which shows the arrangement of FIG. 1 in more detail, the data read by the card reader 2 from a card inserted through the slot 11 in FIG. 2 is stored in a register 16. The identification number of the card included in the data stored in the register 16 is applied to an adder 19. The checker 17 checks the card number. If it has been recognized as invalid, the checker 17 produces an output to be applied through an OR circuit 20 to the card collector 5, which collects the card into the machine. On the contrary, if the card number has been recognized as valid, the checker 17 produces an output to be applied to an AND circuit 21 and a timer 22.

The user of the machine operates the keyboard or dial 6 to enter the necessary data into the machine. The secret number included in this manual data is applied through the AND circuit 21 to a register 23 to be stored therein. A counter 24 counts the number of times of introduction of the manual data. The counter is so designed as to produce an output when that number becomes three. This output from the counter 24 is applied as an inhibit input to an INHIBIT element 26 through an OR element 25. The OR element 25 receives as the other input the output from the timer 22. The timer 22 produces an output a predetermined period of time after receiving the output from the checker 17.

When neither the counter 24 nor the timer 22 produces any output, the secret number stored in the register 23 is allowed to pass through the INHIBIT element 26 into a checker 18, which checks whether there is a predetermined correspondence between the card number read from the card and the secret number entered by the keyboard. If the correspondence exists, the checker 18 produces an output to be applied as an inhibit input to an INHIBIT element 27, rendering this element inoperative. This output from the checker 18 is also applied to the card returning device 4 through an OR element 29 on the one hand and to the cash dispenser 7 on the other. The device 4 returns the card to its owner and the device 7 dispenses the required amount of cash. At this time a register 9 stores the numerical value of "0", which is written by the writer 10 on the card to be returned as the error number.

If the proper correspondence does not exist between the card number and the secret number, an indicator controller 30 operates to give a command that the user of the machine should again enter the secret number. When entering of the secret number has been repeated three times, the counter 24 produces an output to be applied as an inhibit input to the INHIBIT element 26 through the OR element 25 after the contents of the register 23 have been transferred to the checker 18. The output from the counter 24 is also applied to the controller 30 to prevent its operation. If at the third entering of the secret number there is still no proper correspondence between the secret number and the card number, the AND element 28 receives the outputs from both the OR element 25 and the checker 18 to produce an output expressing the numerical value of + 1 to the adder 19. The adder adds this "1" to the error number included in the card data, and the resultant numerical value (a new error number) is stored in the register 9. As previously mentioned, the timer 22 produces an output a predetermined period of time after the introduction of a card into the slot 11. This output is also applied to the adder 19 so that "1" is added to the error number.

The error number stored in the register 9 is checked by a checker 31. If the number exceeds a predetermined number, say, three, the checker 31 applies an output through the OR element 20 to the card collector 5 to collect the card into the machine. However, if the error number is three or less than three, the checker 31 applies an output through the OR element 29 to the card returning device 4. At this time, the error number stored in the register 9 is written on the card by the means of the writer 10.

In the above example, the card is collected into the machine by means of the collector 5. What is intended here is to prevent the card from being used again. Therefore, the card may be returned to the owner provided that it has been invalidated by any suitable means. To invalidate the card, the card data may be changed or erased, or the card data may be memorized in the machine as invalid so that when used again the card may be recognized as invalid, or the card may be physically damaged by punching holes therein.

Figure 4:
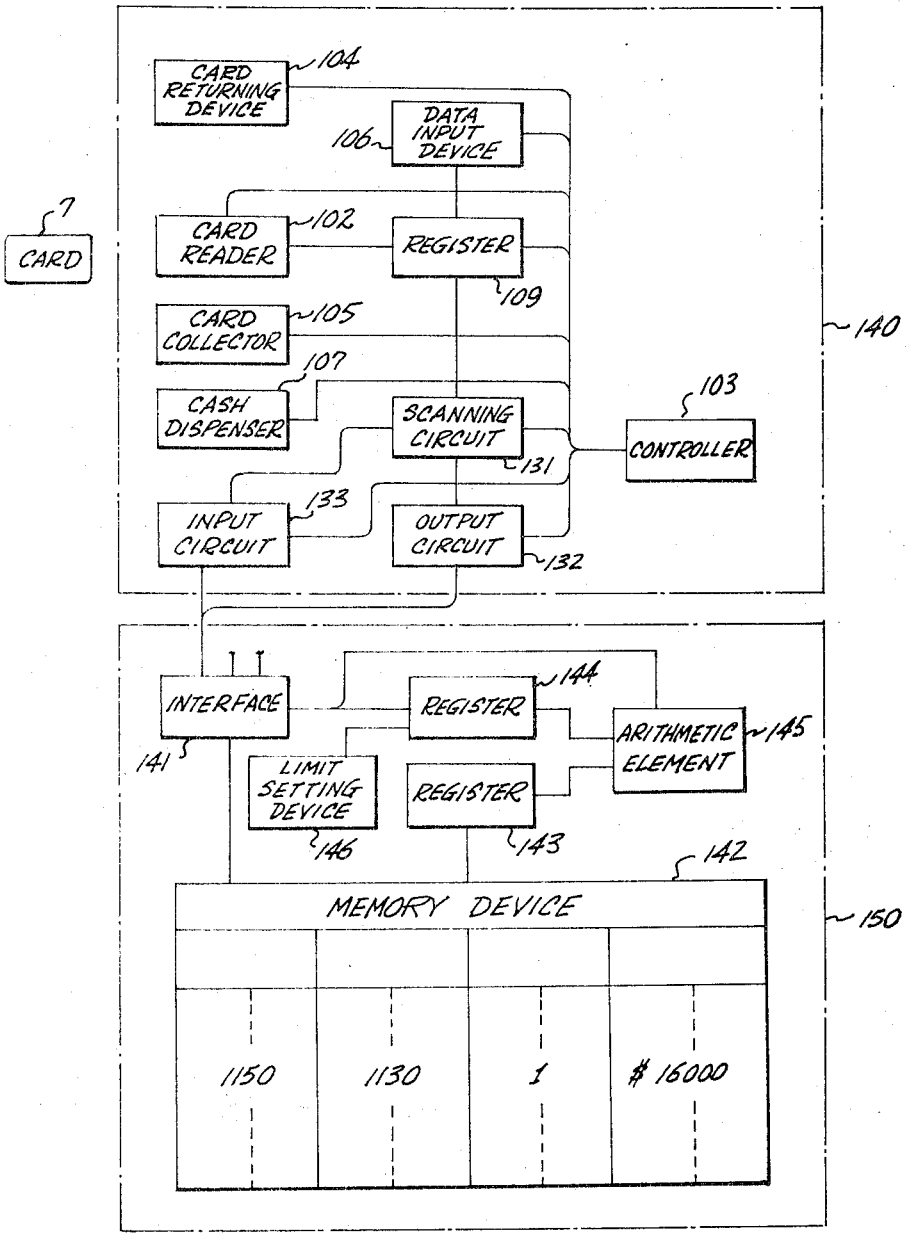
FIG. 4 is an electrical block diagram of another embodiment of the invention.

FIG. 4 shows another embodiment of the invention as applied to a cash dispenser included in an on-line banking system.

A card 1 is put into a card reader 102 included in a terminal machine 140 provided at the counter in a bank. The user of the card manually operates a data input device 106 having a keyboard to enter the secret number of the card into the machine. The card number or account number, say, "1150" read by a card reader 102 is stored in the register 109 under the control of a controller 103, and thence applied through a scanning circuit 131 and an output circuit 132 to an interface circuit 141 of a computer 150, so that a secret number, say, "1130" corresponding to the card number "1150" is withdrawn from a memory device 142 in the computer 150 so as to be stored in a resister 143. The secret number entered by the user of the machine by means of the input device 106 is stored in the register 109 under the control of the controller 103 and thence applied through the scanning circuit 131, the output circuit 132 and the interface circuit 141 to a register 144 in the computer 150 to be stored therein. The two numbers stored in the registers 143 and 144, respectively, are compared by an arithmetic element 145 to see if a predetermined correspondence exists between the two numbers. The result of the comparison is applied to an input circuit 133 in the terminal machine 140.

If the predetermined correspondence does not exist between the two numbers, the error number (that is, the number of times the secret number has been erroneously entered) stored in the memory device 142 of the computer is withdrawn therefrom to be stored in the register 143. On the other hand, a predetermined limit error number is set in a setting device 146 and stored in the register 144. The two numbers stored in the registers 143 and 144, respectively, are compared by the arithmetic element 145. If the error number is equal to the limit number, the element 145 produces an output to be applied through the input circuit 133 of the terminal machine 140 to the collector 105 under the control of the controller 103, so that the collector collects the card into the machine so as not to be returned to the owner. In this case, the card or its number may be invalidated by any other suitable method just as in the previous embodiment.

If the error number is less than the limit error number, it is increased by one and the increased new error number is stored in the memory device 142 of the computer 150. At the same time the element 145 applies an output to the input circuit 133 of the terminal machine to actuate the device 104 to return the card to its user.

If the predetermined correspondence exists between the secret number entered through the keyboard and the corresponding secret number stored in the computer, so that the user of the card is recognized as its proper owner, the arithmetic element 145 produces an output to be applied through the input circuit 133 to the card returning device 104 on the one hand and the cash dispensing device 107 to render the same ready for operation. Under this condition, the user of the machine enters the amount of money he desires to withdraw into the machine by means of the keyboard. The entered amount is stored in the register 144, while the present balance (say, $ 16,000) of the account of the card owner as memorized in the memory device 142 is withdrawn therefrom to be stored in the register 143. The balance and the required amount of money are compared by the arithmetic element 145. If the amount is less than the present balance, the new balance is stored in the memory device instead of the previous balance, and at the same time a signal is applied to the input circuit 133 to actuate the dispensing device 107 to automatically dispense the required amount of cash. On the other hand, the error number is rendered zero or decreased by subtracting a certain number from the previously recorded error number.

Thus, in accordance with the invention, fraudulent use of cards by improper owners can effectively be prevented, while at the same time the proper owner of the card is given a chance to correct his or her previous errors in entering his secret number into the machine, so that it never happens that the card used by its proper owner is invalidated due to mere error in entering his or her secret number into the machine.

In the above embodiment, the secret number entered by the device 106 is compared with the secret number previously stored in the computer and derived on the basis of the account number read from the card used. The arrangement may also be such that the account number read from the card is compared with the account number stored in the computer and derived therefrom on the basis of the secret number entered through the input device 106.

What we claim is:

1. A system for preventing improper use of cards having necessary data recorded thereon in card-actuated machines, comprising: means for reading said data from each said card; means manually operated by the user of said card for inputting data into said system; means for checking whether a predetermined correspondence is present between said read data and said input data; means for storing the number of times of absence of said predetermined correspondence with respect to each said card, said storing means having the capability of indicating the total number of said absence of predetermined correspondence during the life of said card; means for increasing by one the number stored in said storing means when said checking means has decided that there is no correspondence between the read data and the input data; means for returning said card after said number has been stored; and means for invalidating said card when said number becomes a predetermined number.

2. The system of claim 1, wherein said storing means stores said number on each said card.

3. The system of claim 1, wherein said storing means is a computer.

4. The system of claim 1, further including means for decreasing said number stored in said storing means when said predetermined correspondence is present.

5. The system of claim 1, wherein said invalidating means is means for collecting each said card into said system so as not be returned to the user of said card.

6. The system of claim 1, wherein said invalidating means includes means for returning each invalidated card to the user thereof.

7. The system of claim 1, wherein said checking means compares said read data and said input data.

8. The system of claim 3, wherein said checking means compares said input data and the data derived from the computer on the basis of said card data.

9. The system of claim 3, wherein said checking means compares said card data and the data derived from said computer on the basis of said input data.

10. A system for preventing improper use of cards in a card actuated machine comprising: card means for feeding data into said system, said card means having data recorded thereon; means for reading said recorded data; means manually operated for feeding data into said system; means for determining that said manually fed data is uniquely associated with said recorded data; means for incrementally recording an indication of the number of incorrect determinations of said unique association with respect to an individual card means, said recording of said incorrect determinations having the capability of indicating the number of said incorrect determinations during the life of said card means; and means for returning said card.

11. An apparatus in accordance with claim 10, wherein said determining means includes a means for comparing said manually fed data with a preselected number stored within said system, said preselected number being uniquely associated with said recorded data.

12. An apparatus in accordance with claim 11, wherein said card means is invalidated after a predetermined number of said incorrect determinations is recorded.

13. An apparatus in accordance with claim 12 including means to record said indication of the number of incorrect determinations on said card means.

14. An apparatus in accordance with claim 12 including means for storing said indication of the number of said incorrect determinations, said storing means having the capability of storing said indication during the life of said card.

* * * * *